United States Patent

Watts

[11] 4,374,535
[45] Feb. 22, 1983

[54] WHEEL WELL FILLER

[75] Inventor: George T. Watts, North Canton, Ohio

[73] Assignee: The Goodyear Tire & Rubber Company, Akron, Ohio

[21] Appl. No.: 870,367

[22] Filed: Jan. 18, 1978

Related U.S. Application Data

[63] Continuation of Ser. No. 618,258, Sep. 30, 1975, abandoned.

[51] Int. Cl.³ ............................................. B60C 17/00
[52] U.S. Cl. ........................... 152/381.6; 152/330 RF
[58] Field of Search ............... 152/158, 179 R, 181 R, 152/399, 400, 381.5, 381.6; 105/469

[56] References Cited

U.S. PATENT DOCUMENTS

| 632,028 | 8/1899 | Smith | 152/381.6 |
| 1,819,403 | 8/1931 | Baker | 152/381.5 |
| 1,820,857 | 8/1931 | Wilson | 152/381 R |
| 2,440,740 | 5/1948 | Daddio | 152/400 |
| 2,539,997 | 1/1951 | Graves | 105/469 |
| 3,071,348 | 1/1963 | Huber | 105/473 |
| 3,485,283 | 12/1969 | Brehmer et al. | 152/158 |
| 3,948,305 | 4/1976 | Watts | 152/400 |

FOREIGN PATENT DOCUMENTS 2326021  12/1973  Fed. Rep. of Germany ... 152/381 R

*Primary Examiner*—Robert J. Spar
*Assistant Examiner*—Donald W. Underwood
*Attorney, Agent, or Firm*—Frank Pincelli; Frederick K. Lacher

[57] ABSTRACT

An elongated filler of flexible resilient material for an annular well of a rim on which a pneumatic tire having bead portions may be mounted. A reinforcing member of inextensible material is attached to the filler so that the filler may be installed as a unitary member. The filler has a length less than the circumferential distance around the rim at the well providing a space in the well for the tire valve and for a latch fastened to the ends of the reinforcing member. The latch applies tension to the reinforcing member which presses the filler against the rim preventing relative rotation and radial movement out of the well during operation at high speeds.

3 Claims, 7 Drawing Figures

WHEEL WELL FILLER

This is a continuation of application Ser. No. 618,258 filed Sept. 30, 1975, now abandoned.

This invention relates generally, as indicated, to wheel well fillers for filling annular wells in tire supporting rims. The annular wheel well in a rim is provided for mounting the beads over the rim flanges during the mounting of a tire. Upon deflation of the tire, however, there is the danger that the beads will be forced into the well and one or both beads of the tire will come off the rim. With a suitable filler the beads of the tire are prevented for entering the wheel well and the tire cannot come off the rim.

Heretofore, a multipart well filler and retainer has been proposed with spaced-apart blocks in the wheel well retained by spring wire. Difficulties have been experienced in mounting this apparatus on the rim because of the many parts to be assembled and the positions of the beads during the mounting operation. It has also been proposed to inject plastic material into the well after the tire beads are mounted over the rim; however, this presents problems in the process of applying the plastic and also in removing the tire from the rim. Metal covers for the wells have been provided and this has required the use of special rims and tooling. Special rims are also required for wheel well fillers located under or adjacent a bead of the tire. The valve hole in the rim has been located in the wheel well and rotation of the filler relative to the rim can cause the valve hole to be closed. At high speeds the filler is subject to centrifugal force and if not securely retained in the well, the filler will adversely affect the balance and operation of the vehicle.

With the foregoing in mind, it is the principal object of this invention to provide a wheel well filler which can be installed in one piece and mounted in the well under tension.

Another object is to provide a filler with a reinforcing member.

Still another object is to provide for connecting the ends of the reinforcing member under tension.

A further object is to provide space in the well for a valve hole and the fastener connecting the ends of the reinforcing member.

A still further object is to provide a wheel well filler which can be molded in the flat condition.

These and other objects of the present invention may be achieved by a reinforced, elongated member of resilient, flexible material in which the reinforcement extends beyond the ends of the filler so that when it is installed, a space is provided in the well for the valve hole and the tension-applying fastener. The filler may also be installed in one piece after the beads are pulled over the flange of the rim.

To the accomplishment of the foregoing and related ends, the invention, then, comprises the features hereinafter fully described and particularly pointed out in the claims, the following description and the annexed drawings setting forth in detail a certain illustrative embodiment and a modification of the invention, these being indicative, however, of but two of the various ways in which the principles of the invention may be employed.

Figure 1:
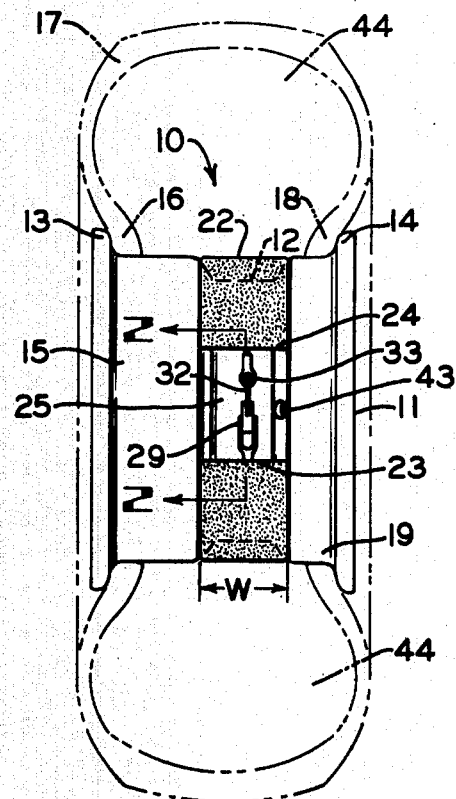
FIG. 1 is a front elevation of a wheel and wheel well filler embodying the invention with a tire on the wheel rim being shown in chain-dotted lines.
Figures 6, 7:
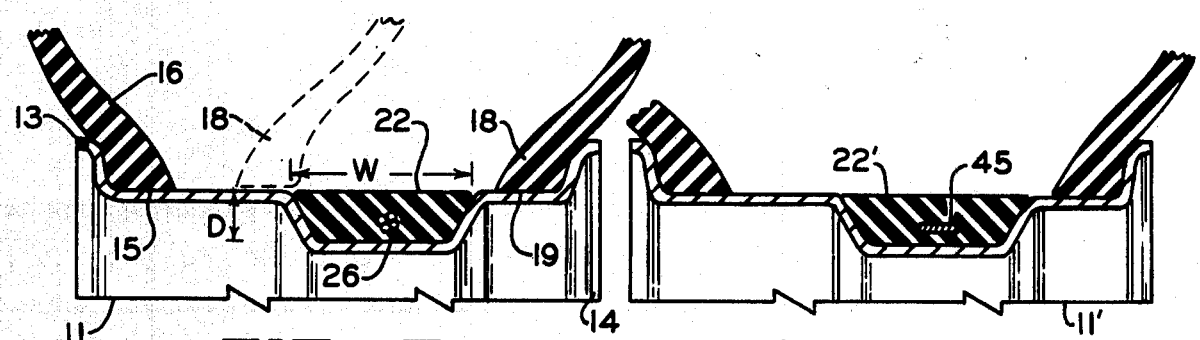
FIG. 6 is a fragmentary transverse sectional view of the rim and wheel well filler with the mounted tire beads shown in full lines and with one of the beads shown in dotted lines in position for installation of the wheel well filler.
FIG. 7 is a view like FIG. 6 showing a modified form of reinforcement for the filler.

Referring to FIGS. 1 and 6, a wheel well filler and rim assembly 10 is shown in which a rim 11 of a conventional drop center type wheel (not shown) has an annular well 12 extending circumferentially of the rim and spaced from a first side flange 13 on one side and a second side flange 14 on the opposite side of the rim. Adjacent the first side flange 13 is a first bead seat 15 for seating of a first bead portion 16 of a tire 17 which may be of the pneumatic tubeless type having a U-shaped cross section with the first bead portion mounted at one edge and a second bead portion 18 mounted at the other edge. A second bead seat 19 of the rim 11 is located adjacent the second side flange 14 for seating the second bead portion 18 of the tire 17. The first bead seat 15 and the second bead seat 19 are tapered for improved seating of the first bead portion 16 and second bead portion 18, respectively, and in this embodiment the taper is 5 degrees relative to a cylindrical surface of revolution about the axis of the wheel on which the rim 11 is mounted.

A wheel well filler 22 is mounted in the well 12, as shown in FIGS. 1 and 6. The filler 22 may be molded flat of a resilient, flexible material such as urethane so that it is flat in the relaxed state. The filler 22 is an elongated body with a cross section permitting insertion into the well 12. The length of the filler 22 from end 23 to an opposite end 24 is not greater than the circumference of the rim 11 at the well 12 and preferably the length is less than the circumference so that in the installed condition a space such as gap 25 is provided in the well between the ends of the filler.

The filler 22 has a width W, as shown in FIGS. 1 and 6, which is not greater than the width of the well 12; however, the width may be less than the width of the well provided the resulting spaces between the edges of the filler and the edges of the well are not larger than the width of the first bead portion 16 or second bead portion 18 of the tire 17. The depth D of the filler 22, as shown in FIG. 6, is also not more than the depth of the well 12 to permit passage of the second bead portion 18 over the filler during installation. The depth D is great enough to prevent removal of the first bead portion 16 or second bead portion 18 of the tire 17 over the first side flange 13 or second side flange 14 of the rim 11 during operation of the tire in the deflated condition.

A reinforcing member of inextensible material such as steel wire cable 26 extends lengthwise of the filler 22 and is attached to the filler as by molding the cable in the urethane body of the filler. The cable 26 may be attached by other means such as adhesive in order that the cable and filler 22 may be installed as a one-piece assembly. The length of the cable 26 is substantially the same as the circumference of the rim 11 at the well 12 and in the installed condition as shown in FIGS. 1 and 2, the cable is in tension with cable ends 27 and 28 connected by tension-applying fastening means such as an over-center latch 29.

As shown in FIGS. 2, 3, 4 and 5, the over-center latch 29 has an adjustable hook 32 for engagement with an eye 33 fastened to the cable end 27. The hook 32 is pivotally connected to a pin 34 mounted on a lever 35 which is pivotally mounted on a pivot pin 36 extending between parallel links 37 and 38 connected to a clevis member 39 by a third pivot pin 42. The clevis member 39 is fastened to the cable end 28.

Figure 2:
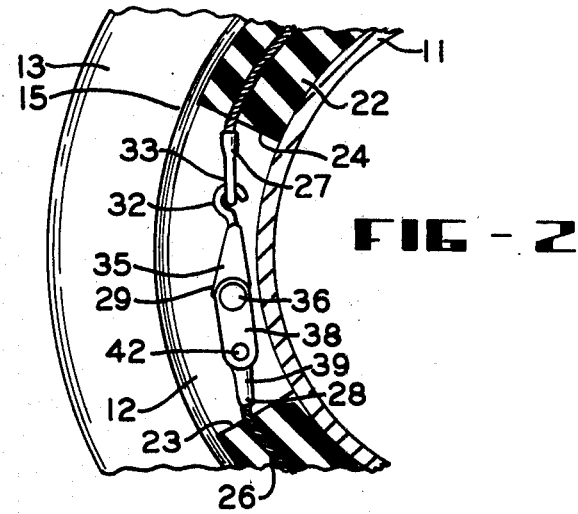
FIG. 2 is a fragmentary circumferential sectional view taken along the plane of line 2—2 in FIG. 1.
Figure 3:
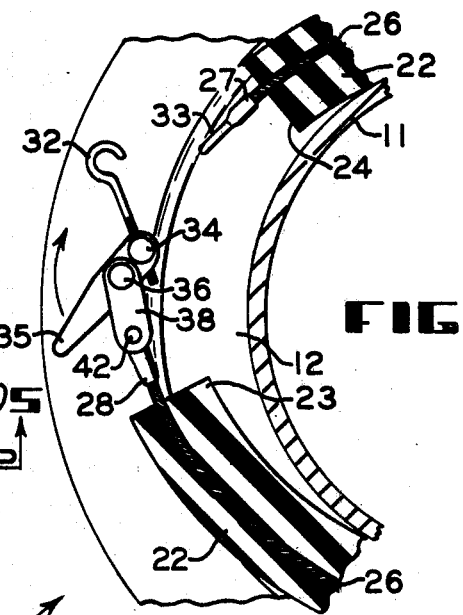
FIG. 3 is a sectional view like FIG. 2 showing the wheel well filler in the unlatched condition.
Figure 4:
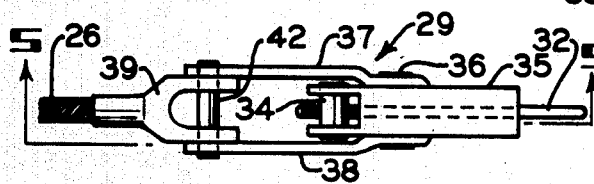
FIG. 4 is an enlarged plan view of the latch shown in FIG. 1.
Figure 5:
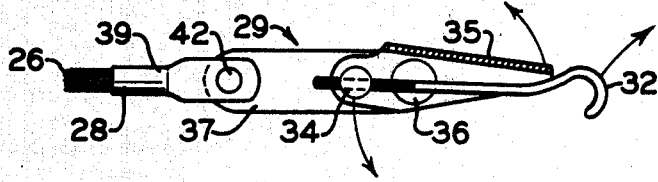
FIG. 5 is a sectional view of the latch shown in FIG. 4 taken along the plane of line 5—5 in FIG. 4.

As shown in FIG. 3, the latch 29 is in the open position with the lever 35 rotated in the counterclockwise direction to extend the hook 32 for insertion in the eye 33. After the hook 32 and eye 33 are engaged, the lever 35 is moved in the clockwise direction, as shown by the arrow in FIG. 3, causing the pin 34 to be moved away from the eye and applying tension to the cable 26 in the position shown in FIGS. 2, 4 and 5. The pin 34 connected to the hook 32 is moved into an off-center position, as shown in FIG. 5, and held in this position by the tension in the cable 26. To release the cable 26, the lever 35 is moved in the counterclockwise direction around pivot pin 36, as shown by the arrow in FIG. 5, causing the pin 34 connected to the hook 32 to move in the counterclockwise direction and extend the hook so that it may be removed from the eye 33.

The latch 29 is of a size wherein the depth of the latch is not greater than the depth D of the well 12, as shown in FIG. 2, and the length of the latch is not greater than the length of the gap 25 between the ends 23 and 24 of the filler 22. The second bead portion 18 may move over the latch 29 without interference during the installation of the filler 22 and mounting of the tire 17.

The rim 11 has a valve opening 43 for insertion of a valve and this opening is located in the side of the well 12. As shown in FIG. 1, the filler 22 is mounted in the well so that the gap 25 is located adjacent the valve opening 43 with the ends 23 and 24 of the filler spaced circumferentially from the valve opening. This permits communication from the valve to tire cavity 44 for inflation and deflation of the tire 17. By mounting the filler 22 under tension, the resilient material of the filler is pressed against the surface of the rim 11 and the filler is prevented from turning and moving circumferentially in the well 12. Accordingly, the valve opening 43 will remain unobstructed for operation of the valve to inflate and deflate the tire 17.

Referring to FIG. 6, the wheel well filler 22 is shown in the well 12 and the second bead portion 18 is shown in full lines mounted in the second bead seat 19 against the second side flange 14. The second bead portion 18 is also shown in dotted lines in the position it is pushed into to permit installation of the filler 22. With the one-piece construction of the filler 22, installation is facilitated because the filler can be progressively inserted in the well 12 and only one portion of the second bead portion 18 needs to be pushed away from the well at one time. Prior to installation of the filler 22, the first bead portion 16 has been inserted in the well 12 and pulled over the second side flange 14 of the rim 11. The second bead portion 18 has then been inserted in the well 12 and pulled over the second side flange 14. The second bead portion 18 would normally take a position between the well 12 and second side flange 14; however, to install the filler 22, the second bead portion is urged to the left, as shown in FIG. 6, to the position shown in dotted lines. With this construction, only one portion of the second bead portion 18 need be pushed to this position at one time in order to insert one portion of the filler in the well 12. Following the insertion of the first portion of the filler 22 in the well 12, another portion of the second bead portion 18, circumferentially spaced from the first portion, may be pushed away from the well and a second portion of the filler inserted. This procedure continues around the tire 17 and rim 11 until all of the filler 22 is inserted in the well 12 and the ends 23 and 24 are exposed, as shown in FIG. 3, for connection and application of tension by the latch 29 connected to the cable ends 27 and 28. After the latch 29 is engaged and takes the position shown in FIG. 2, the second bead portion 18 of the tire 17 may be released adjacent the latch to take a position between the well 12 and the second side flange 14. The second bead portion 18 of the tire 17 may then be seated in the second bead seat 19 of the rim 11 and urged into engagement with the second side flange 14 by conventional tire mounting equipment and inflation of the tire.

To dismount the tire 17 from the rim 11, the second bead portion 18 is moved to the left, as shown in FIG. 6, to the position shown in dotted lines over the gap 25 and the latch 29 released. The filler 22 can then be progressively pulled out of the well 12 by pushing circumferentially spaced portions of the second bead portion to the position shown in dotted lines in FIG. 6. The tire 17 may then be dismounted in a conventional manner.

As shown in FIG. 7, a wheel well filler 22' of resilient, flexible material such as urethane may have a reinforcing member such as a steel strap 45 embedded in the filler and extending lengthwise thereof. The steel strap 45 may have ends connected by a tension-applying fastening means (not shown). Upon application of tension to the strap 45, the wheel well filler 22' will be pressed into engagement with the rim 11' preventing movement of the filler 22' radially outward due to centrifugal force and circumferentially due to torque forces. The wheel well filler 22' of this modification may be installed and removed in a similar manner to the wheel well filler of the embodiment shown in FIGS. 1 through 6.

While certain representative embodiments and details have been shown for the purpose of illustrating the invention, it will be apparent to those skilled in the art that various changes and other modifications may be made therein without departing from the invention.

What is claimed is:

1. A wheel well filler and rim assembly for mounting a pneumatic tire of the type having a U-shaped cross section and bead portions at the edges comprising a generally cylindrical rim having bead seats and an annular wheel well between said bead seats, said bead seats having a greater diameter than said wheel well, a wheel well filler of flexible, resilient material disposed in said well, said filler having a depth not greater than the depth of said well and a length less than the circumference of said well providing a gap in said well between spaced-apart ends of said filler, an inextensible reinforcing member extending circumferentially of said well and being molded in said filler, said reinforcing member having a circumference substantially the same as the circumference of said rim at said well, and a tension-applying over-center latch positioned in said gap and fastened to one of the spaced-apart ends of said reinforcing member and in detachable engagement with the other of said spaced-apart ends to form a circumferentially continuous ring, said wheel well filler and reinforcing member forming a one-piece assembly for mounting in said wheel well with said latch as a unit, said latch having a depth not greater than the depth of said well so that said filler including said latch has a diameter not greater than the diameter of said bead seats, and placing said ring and said reinforcing member under tension whereby said filler is pressed against said rim for application of said over-center latch and retention of said filler in said well without turning relative to said rim during rotation of said assembly.

2. A wheel well filler and rim assembly according to claim 1 wherein said reinforcing member further comprises a wire cable.

3. A wheel well filler and rim assembly according to claim 1 wherein said reinforcing member is a metal strap.

* * * * *